United States Patent
Siddiqui et al.

(10) Patent No.: US 10,970,924 B2
(45) Date of Patent: Apr. 6, 2021

(54) RECONSTRUCTION OF A SCENE FROM A MOVING CAMERA

(71) Applicant: Foresight AI, Inc., Los Gatos, CA (US)

(72) Inventors: Matheen Siddiqui, Long Beach, CA (US); Chang Yuan, Los Gatos, CA (US)

(73) Assignee: Foresight AI Inc., Los Gatos, CA (US)

( * ) Notice: Subject to any disclaimer, the term of this patent is extended or adjusted under 35 U.S.C. 154(b) by 0 days.

(21) Appl. No.: 16/428,221

(22) Filed: May 31, 2019

(65) Prior Publication Data
US 2019/0385361 A1    Dec. 19, 2019

Related U.S. Application Data

(60) Provisional application No. 62/686,050, filed on Jun. 17, 2018.

(51) Int. Cl.
*G06T 17/05* (2011.01)
*G06T 7/579* (2017.01)
*H04N 5/225* (2006.01)

(52) U.S. Cl.
CPC .............. *G06T 17/05* (2013.01); *G06T 7/579* (2017.01); *H04N 5/2253* (2013.01); *G06T 2207/10028* (2013.01); *G06T 2219/2008* (2013.01)

(58) Field of Classification Search
CPC ............. G06T 17/05; G06T 7/579; G06T 2207/10028; G06T 2219/2008; H04N 5/2253
See application file for complete search history.

(56) References Cited

U.S. PATENT DOCUMENTS

| | | | |
|---|---|---|---|
| 2011/0295569 A1* | 12/2011 | Hamke | G01P 5/00 703/2 |
| 2012/0050524 A1* | 3/2012 | Rinner | G06T 3/40 348/117 |

(Continued)

OTHER PUBLICATIONS

Kim, S. et al., "Characterization of Quadratic Nonlinearity between Motion Artifact and Acceleration Data and its Application to Heartbeat Rate Estimation," Sensors, Aug. 2017, vol. 17, No. 8, pp. 1-14.

(Continued)

*Primary Examiner* — Terrell M Robinson
(74) *Attorney, Agent, or Firm* — Fenwick & West LLP (57) ABSTRACT

A method of using a drone that is equipped with a camera and an inertial measurement unit (IMU) to survey an environment to reconstruct a 3D map is described. A key frame location is first identified. A first image of the environment is captured by the camera from the key frame location. The drone is then moved away from the key frame location to another location. A second image of the environment is captured from the other location. The drone then returns to the key frame location. The drone may perform additional rounds of scans and returns to the key frame location between each round. By constantly requiring the drone to return to the key frame location, the precise location of the drone may be determined by the acceleration data of the IMU because the location information may be recalibrated each time at the key frame location.

20 Claims, 8 Drawing Sheets

(56) References Cited

U.S. PATENT DOCUMENTS

| | | | |
|---|---|---|---|
| 2015/0094952 A1* | 4/2015 | Moeglein | H04W 4/33 |
| | | | 701/491 |
| 2016/0203373 A1* | 7/2016 | Menashe | G06K 9/00664 |
| | | | 382/104 |
| 2016/0253808 A1* | 9/2016 | Metzler | G01C 15/00 |
| | | | 382/103 |
| 2018/0188060 A1* | 7/2018 | Wheeler | G01C 21/3638 |
| 2019/0156570 A1* | 5/2019 | Sanjurjo | G06K 9/00637 |
| 2019/0355145 A1* | 11/2019 | Bruner | H04W 4/02 |
| 2020/0104598 A1* | 4/2020 | Qian | H04N 5/23203 |
| 2020/0207474 A1* | 7/2020 | Foggia | B64C 39/024 |

OTHER PUBLICATIONS

Novatel, "IMU Errors and Their Effects," Feb. 21, 2014, pp. 1-6.
Wedel, A. et al., "Stereo Scene Flow for 3D Motion Analysis," Chapter 2, Springer, 2011, pp. 5-34.

* cited by examiner

RECONSTRUCTION OF A SCENE FROM A MOVING CAMERA

CROSS REFERENCE TO RELATED APPLICATION

This application claims the benefit of U.S. Provisional Application No. 62/686,050, filed Jun. 17, 2018, which is incorporated by reference in its entirety.

BACKGROUND

This disclosure relates generally to reconstructing a map of an environment. Specifically, embodiments described herein relate to using cameras to capture objects in different poses to reconstruct models of the objects.

A survey of an environment to capture different objects in an environment can be performed through a drone equipped with a scanning device. To reconstruct a map such as a three-dimensional (3D) map, data describing distances and scales among the objects in the environment is often required. While professional scanning devices such as those that use light detection and ranging (LIDAR) technology may provide a precise scan of an environment, the use of those devices are often expensive. As such, the scalability of using those devices to conduct extensive scans of wide areas is often limited by the associated costs. A regular camera may also be used to capture images of an environment. However, without a LIDAR device, it is often challenging to use images captured by regular cameras to perform 3D reconstruction of an environment because those camera images lack information of precise depths of the objects captured.

SUMMARY

Drones equipped with cameras may perform a survey of a scene to reconstruct 3D models of the environment the scene with high precision. This allows inexpensive drones equipped with a consumer grade scanning device (e.g. a regular camera) and an inertial measurement unit (IMU) to survey an area. Conventionally, an IMU often fails to identify the location of a drone with sufficient precision that allows images taken from a camera carried by a drone to be used to reconstruct a 3D environment. An IMU may inherently have high noise and usually only detects acceleration based on the force exerted on the IMU. Rather than a direct measure of location, the location information is computed from IMU data by twice integrating the acceleration data with respect to time, but such computation is often imprecise. As such, it has been challenging to use an IMU to generate sufficiently precise location data to allow the precise depth of objects in an environment to be determined. Images captured by the camera alone fail to provide sufficiently precise information about the depth and scale of the objects in the environment.

To enable a drone that is equipped with a camera to generate sufficient precise data that enable reconstruction of a 3D map, a drone may use an approach that involves returning to a "key frame" location while surveying an environment. In one embodiment, a scan process may begin when a drone that is equipped with a camera and with an IMU arrives at a key frame location. The key frame location may be an arbitrary initial location or may be determined based on features in the environment. The camera at the key frame location first captures an image of an object (e.g. road sign) in the environment. The drone then moves the camera at a direction away from the key frame location to a second location. The distance between the key frame location and the second location should be short relative to the precision of the IMU. A movement of a short distance ensures that the location information derived from the acceleration data of the IMU is still accurate enough with respect to the key frame location and that image data from the key frame can be seen from different perspectives multiple times. At or on the way to the second location, one or more images of the object are captured. The drone then returns to the key frame location. To confirm that the drone returns to the key frame location, the image viewed by the camera may be compared with the image captured at the key frame location. Multiple rounds of scans of the object from different angles are performed by repeating such return-to-the-key-frame approach. Each round of scan generates images as well as precise location information of the camera when the images are captured. Those images are used to reconstruct a 3D map by various computer vision techniques such as optical flow and homography.

The reconstruction of a precise 3D map is possible using this approach because the location information of the drone is constantly recalibrated by having the drone to return to the key frame location before performing another round of scan. Since the drone's location is determined by integrating the acceleration data of the IMU twice, the error associated with the IMU (e.g., those caused by the noise of the IMU) may grow significantly as time passes. By returning to the key frame, each return to the key frame location recalibrates the error of the drone's location. The return also places constraints among the individual short movements so that the captured images share similar perspectives as the key frame image to allow the image data to be closely related and be useful in 3D reconstruction. According to one embodiment, the drone only travels a small distance away from the key frame location before returning to the key frame location. The computation of the location is then restarted after the drone has returned to the key frame location. Hence, the error in the location information associated with each round of scan is kept small and remains precise enough for use in 3D reconstruction. As such, drones that are merely equipped with a camera and a relatively low precision IMU may be used to conduct an extensive survey of a wide area for the purpose of 3D reconstruction of a map.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
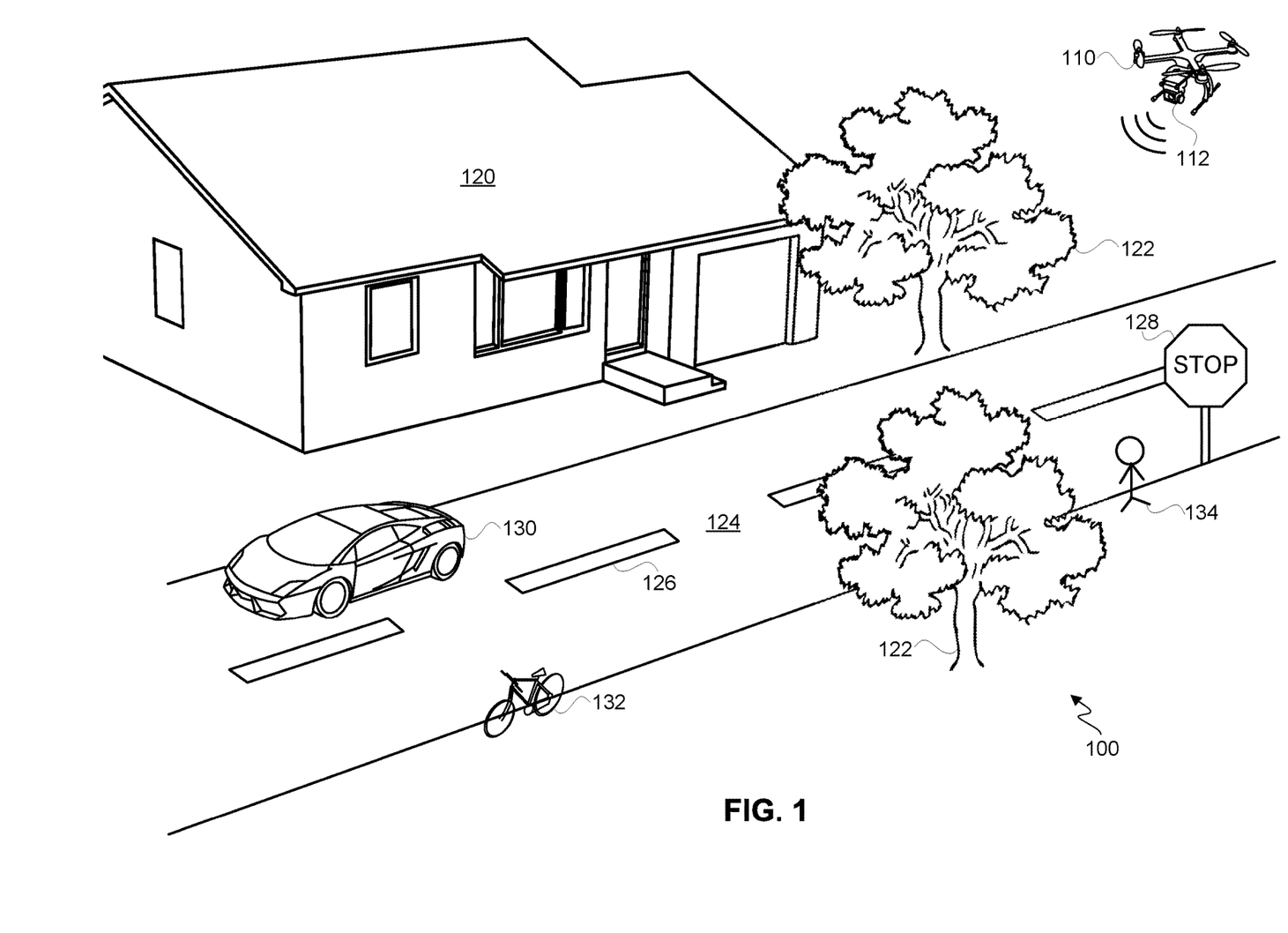
FIG. 1 is a diagram illustrating an exemplary scenario of a scanning process of a scene by a drone.

FIG. 1 is a diagram illustrating an exemplary scenario of a scanning process of a scene 100 by a drone 110. A scene is a place to be scanned to construct a digital map. Depending on the location, the environment of a scene may include various stationary objects and moving objects. For example, the environment of the scene 100 in FIG. 1 includes stationary objects such as a house 120, trees 122, a street 124, a series of street dividers 126, and a road sign 128. The scene 100 also includes moving objects such as a moving car 130, a traveling bicycle 132, and a walking pedestrian 134. Some of the objects in the environment may be classified as landmarks. A landmark described here is an object or feature of an environment that is easily identifiable based on a database of images of different common objects. For example, in the scene 100, the road sign 128, which can be a common stop sign, may be a landmark. The house 120 may also be a landmark, depending on the design of the house and how readily the house is identifiable by a computer.

In one embodiment, the drone 110 is equipped with one or more cameras 112 that capture images of the scene 100 around and below the drone 110. Example drones include any suitable aerial, land, or sea vehicles, manned or unmanned, and autonomous, semi-autonomous, or manual. The drone 110 may also be equipped with an inertial measurement unit (IMU) that measures forces, acceleration, and angular rotation of the drone 110. The drone 110 may additionally be equipped with a global positioning system (GPS) that provides geolocation of the drone 110. The drone 110 may further be equipped with other location assistant devices including barometer and altimeter.

The camera 112 can be a digital camera that includes a lens used to capture optical images of the scene 100 to generate digital data of the images. In one embodiment, the camera 112 may be permanently connected to the drone 110. In another embodiment, the camera 112 may be removably mounted on the drone 110. For example, in one case the camera 112 may be a separately-purchased action camera that is secured by a mount of the drone 110. In another case, the camera 112 may also be a part of a smartphone that is held by the drone 110. The camera 112 may be connected to a rotational mount such as a gimbal that allows the camera 112 to rotate in different angles. In one embodiment, the camera 112 is a dedicated camera for surveying and scanning scenes. The drone 110 may be equipped with a separate camera for navigation.

The IMU includes one or more accelerometers and one or more gyroscopes. The accelerometers measure the force exerted on the drone 110 and detect the translational acceleration of the drone 110. Multiple accelerometers cooperate to detect the acceleration of the drone 110 in the three-dimensional space. For example, a first accelerometer detects the acceleration in the x-direction, a second accelerometer detects the acceleration in the y-direction, and a third accelerometer detects the acceleration in the z-direction. The gyroscopes detect the rotations and angular acceleration of the drone 110.

Figure 2:
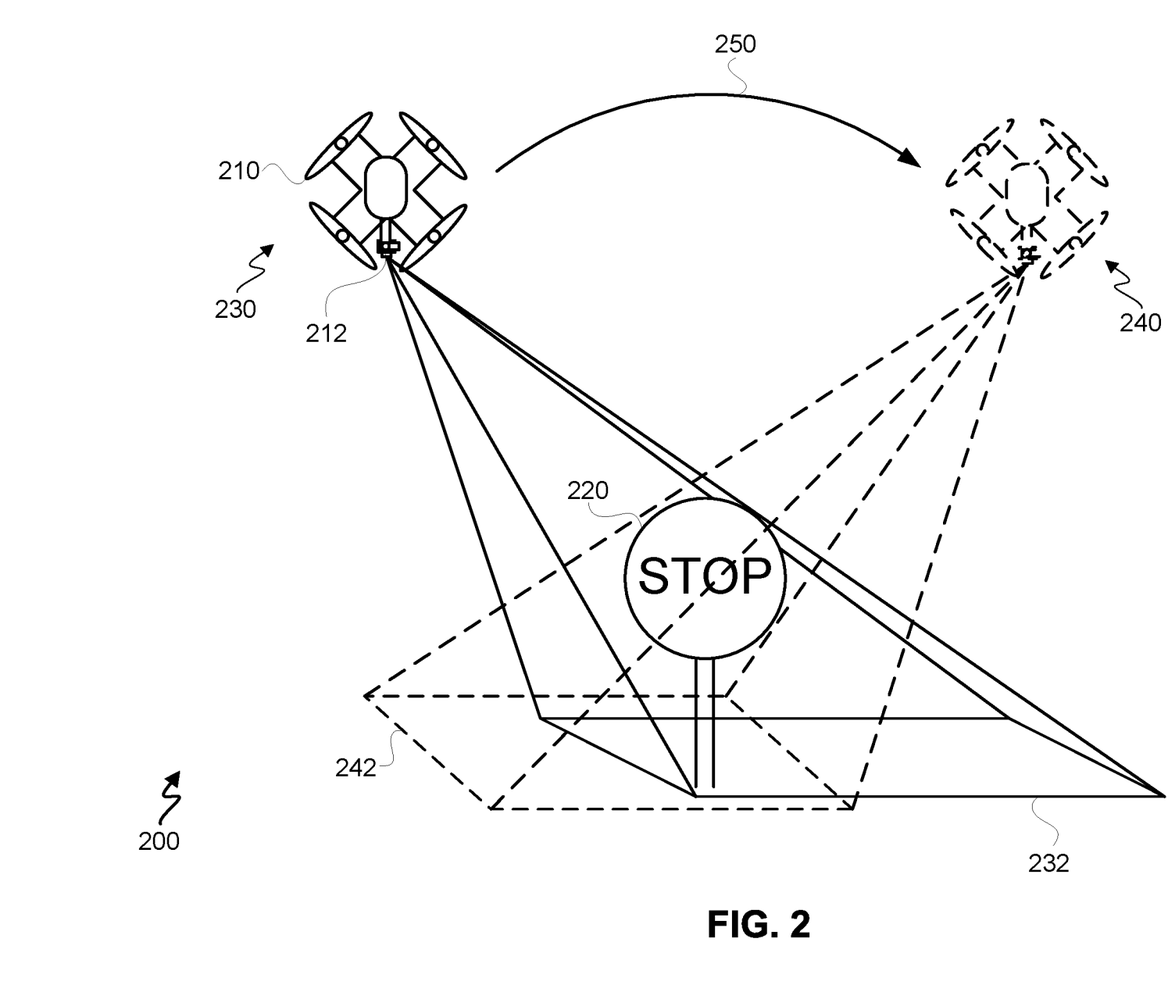
FIG. 2 is a diagram illustrating an image capturing process of a scene using a camera positioned at different angles and positions, in accordance with an embodiment.

FIG. 2 is a diagram illustrating an image capturing process 200 using a camera positioned at different angles and positions. A drone 210 carrying a camera 212 is used to survey an environment of a scene that includes an object 220. The object 220 may be any suitable object in the scene but preferably a stationary object. In one case, the object 220 is a landmark that is easily identifiable in the scene. For example, the object 220 may be a road sign. By using the process 200, the object 220 is captured at different poses of the drone 210, which provides different views of the object 220. A pose describes the position and orientation of an object in a 3D space. The camera 212 captures images of different perspectives of the object 220 as the drone 210 changes positions and angles relative to the object 220.

The process 200 starts with the drone 210 positions the camera 212 at a first location 230. The camera 212 captures a first image from a first perspective of the object 220 at the first location 230. The drone 210 then relocates to a second location 240. The drone 210 at the second location 240 is represented by dashed lines. The drone 210, equipped with an IMU, may record the distance and direction of the second location 240 relative to the first location 230 estimated based on motion data captured from the IMU. The camera 212 then captures a second image of the object 220 at the second location 240. The second image is associated with a second perspective of the object 220. The camera 212 may also capture additional images of the object 220 when the camera 212 moves along the path 250 from the first location 230 to the second location 240. Each additional image may be associated with a different perspective of the object 220. The drone 210 may also travel to additional locations to capture additional images of the object 220 that are associated with different perspectives. In addition, the process 200 can be repeated for various different parts of a scene and various different objects in the scene.

After different images are captured, a processor may combine the images to construct a 3D geometry of the object 220 in a scene. The reconstruction of the scene using images captured by the camera 212 may be based on various computer vision techniques such as optical flow and/or homography. For example, optical flow can be used to determine the relative motion of the object 220 across images. Using the motion of the object in the image in conjunction with the estimated movement of the drone from the first location 230 to the second location 240, the distance from the drone to different parts of the objects are estimated. By taking consecutive images of the object 220, techniques such as optical flow can determine the edges of the object 220. Homography can be used to compute a homography matrix that relates the transformation between two or more planar images that are projected on different planes. When a homography matrix is determined, other projections of an object in different poses may be determined and a 3D geometry of the object may be reconstructed. After sufficient images of a scene are taken with different poses, the 3D geometry of different objects can be determined and a 3D map of the scene can be reconstructed.

One challenge of using digital images to reconstruct a 3D map a scene is that the precise depth of various parts of the objects may be difficult to be determined. For example, an image that is projected on a plane may not include sufficient distance information regarding the distance between the camera and the object. Hence, a 3D reconstruction of a scene often also relies on the location information of the camera when images are captured. For example, in order to accurately reconstruct the 3D geometry of object 220, the distance and direction between the first location 230 and the second location 240 may also be needed.

Figure 3:
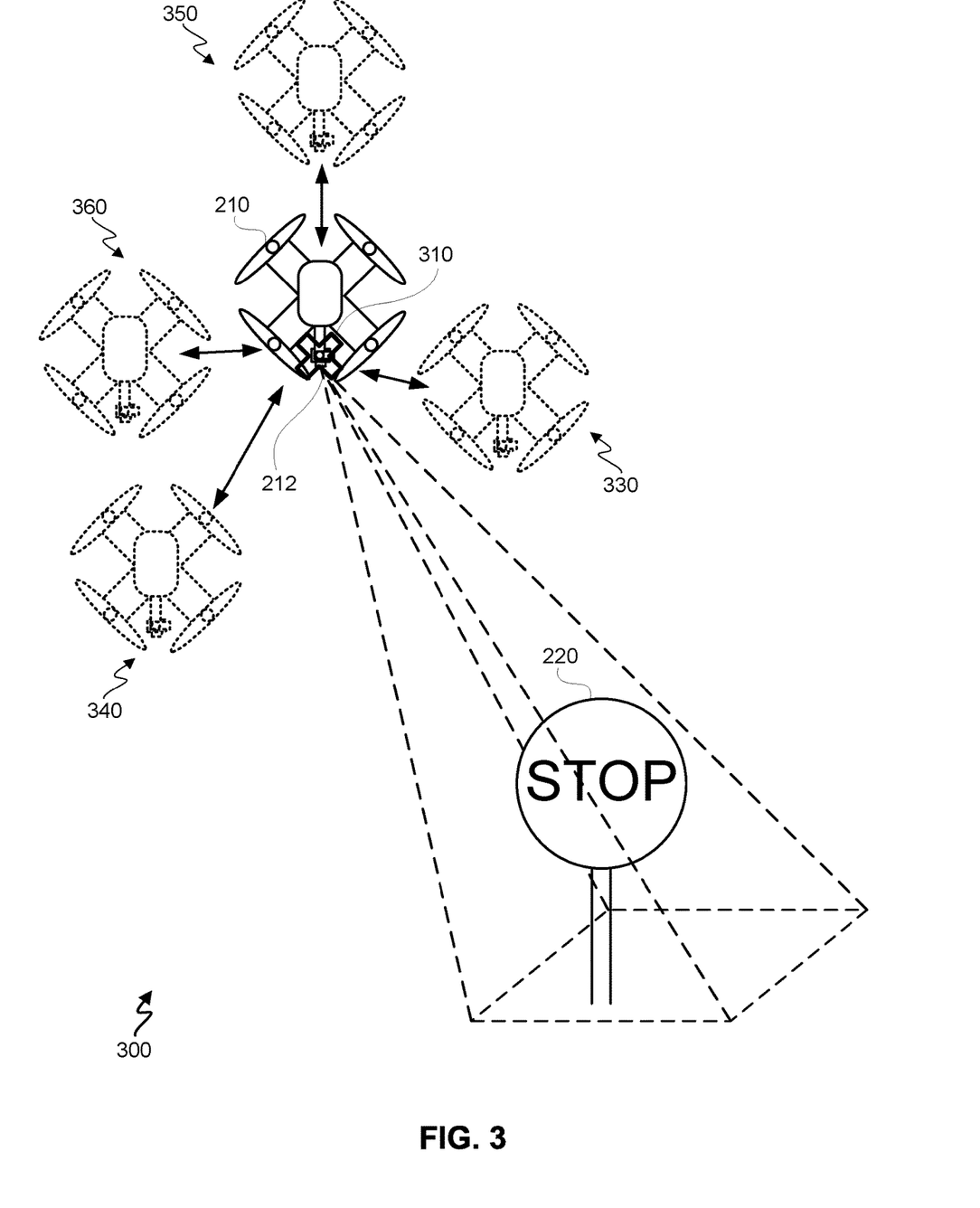
FIG. 3 is a diagram illustrating a process of capturing various images of a scene using a return-to-the-key-frame approach, in accordance with an embodiment.

FIG. 3 is a diagram illustrating a process 300 of capturing various images of a scene using a return-to-the-key-frame approach that provides precise location information of a camera relative to an object when the camera captures images of the object, in accordance with an embodiment. The process 300 involves constantly recalibrates the position of the camera.

In the process 300, the drone 210 carrying the camera 212 surveys a scene that includes an object 220. Initially, a key frame location 310, which is denoted in FIG. 3 by a cross at the camera location of the drone 210 that is presented solid lines, is identified and fixed. To identify a possible key frame location 310 in a scene, the drone 210 may first search for identifiable characteristics of the scene based on the available sensors equipped by the drone 210. In some cases, in addition to a GPS and an IMU, the drone 210 is equipped with barometer and altimeter. In one embodiment, the key frame location 310 is determined based on the available sensors of the drone 210 to select an easily identifiable location that can be tracked by the various sensors. In another embodiment, the key frame 310 can be an arbitrary starting location, but some characteristics of the starting location are recorded. The drone 210 may also identify key objects such as a landmark, which can be a building, a road sign, or any other readily identifiable things in the environment of the scene. As discussed in further details below, the drone 210 may then use those identifiable characteristics (including GPS locations, pressure, altitude, key objects) as references in later time to determine whether the drone 210 has returned to the key frame location.

The drone 210 may first position the camera 212 at the key frame location 310. The camera 212 takes a key frame image of the scene that includes the object 220. The key frame image is associated with a key frame perspective of the object 220. The key frame perspective is based on the distance and orientation between the camera 212 at the key frame location 310 and the object 220. After the key frame location 310 is fixed and the key frame image is taken, the drone 210 can begin multiple rounds of scans of the object 220. Each round of the scan includes the camera starting at the key frame location 310, moving to a displaced location, capturing an image of the object 220 in a pose different than the key frame pose and/or capturing additional images of the object 220 along the path of moving to the displaced location, and returning the camera 212 to the key frame location 310.

For example, a round of the scan may begin with the camera 212 taking a first image of the object 220 at the key frame location 310. The drone 210 then moves the camera 212 at a direction away from the key frame location 310 to a first displaced location 330. It should be noted that the distance between the key frame location 310 and the first displaced location 330 should be short. What constitutes a short distance may depend on situations and the IMU of the drone 210. In one case, the drone 210 moves the camera 212 several meters from the key frame location. In another case, the distance between the key frame location 310 and a displaced location is alternatively or additionally based on the noise level and the accuracy of the IMU equipped by the drone 210. The error level of the distance data determined based on the acceleration data of the accelerometers of the done 210 normally grows with time. Hence, maximum distance allowed between the key frame location 310 and a displaced location may be based on a confidence level that the computed location of the drone 210 is within a certain radius of the actual location of the drone 210. For example, the maximum distance allowed may depend on the time spent by the drone to travel from the key frame location 310 such that there remains a certain level of confidence that the error in location data is within a meter in radius. Other criteria to set the distance traveled by the drone from the key frame location 310 are also possible. Also, in one embodiment, the movement from the key frame location 310 to a displaced location is limited to a specific direction from the key frame location 310, such as lateral or vertical movement.

During and/or after the traveling of the drone 210 to the displaced location 330, the camera 212 captures a second image and/or additional images of the object 220 in different perspectives. Those images are useful in determining the precise depth of the object 220 and in reconstructing the 3D model of the scene because the actual location of camera relative to the key frame location 310 can be determined relatively accurately. After images are taken at the displaced location 330, the drone 210 moves the camera 212 back to the key frame location 310. The return and the determination of the key frame location 310 are possible using data of the IMU of the drone 210 because the travel distance and time of the drone are short and the data in the IMU remains relatively accurate. The short traveling of the drone allows the images captured in different displaced locations are close enough (such as in terms of the perspectives, the distances, and/or the scales) to the key frame image. As such, the image data are closely related and are useful in 3D reconstruction.

Besides the IMU data, the drone 210 may also monitor different characteristics of the environment and compare those characteristics to the previously recorded characteristics of the key frame location 310 to determine whether the camera 212 has returned to the key frame location 310. The characteristics may include GPS locations, pressure, altitude, and other measurable metrics. The camera 212 may also capture images of the environment and/or of the key objects in the environment and use those images to determine the key frame location 310. For example, a key object 220 such as a road sign is identified as a key characteristic associated with the key frame location 310. Before the camera 212 left the key frame location 310, the camera 212 captures a key frame image that is associated with a particular perspective of the road sign 220. After the camera 212 travels away and attempts to return to the key frame location 310, the IMU data allows the camera 212 at least to return to a location in proximity to the key frame location 310. In turn, the camera 212 continues to capture images of the road sign 220 in perspectives that might be slightly different than the precise perspective in the key frame image. Some of the identifiable points of the image of the road sign (such as the edges of the road sign, the corners of the letters of the road sign, etc.) might have different scales and orientations in the newly captured images when compared to the corresponding points in the key frame image. Based on the scales and orientations of those points in the images, a processor may cause the drone 210 to adjust its position until the image aligns and agrees with (or substantially aligns within a tolerance) the key frame image captured earlier.

For example, the top left corner and the top right corner of the letter "T" in the road sign 220 can be two identifiable points. These two points have a certain scale and orientation in the key frame image. Images captured at locations near the key frame location 310 but not exactly the key frame location have these two points in different scales and orientations. In a given image, these two points might be further away from each other the letter "T" is bigger) than in the key frame image. This might indicate that the camera should move slightly away from the road sign 220. A processor may continue to analyze points in images of the road sign 220 to move the drone 210 until the key frame location 310 is located again.

Although different techniques may be employed to determine whether the camera returns to the key frame location, the return to the key frame does not have to be perfect in some embodiments. The location data and image information within a range of short distance in some cases can be sufficient to compute depths of objects with precision.

After the camera 212 returns to the key frame location 310, the location and movement data between the short scans of the drone 210 based on the accelerometers can be combined and used in computations of depth. For example, the time used in the integration of the acceleration data can be reset to zero so that the movement of the camera 212 associated with the next round of scan is independent of the movement associated with the previous rounds. These independent motions can then be integrated with associated image data to more precisely compute depths. A processor may cause the drone 210 to conduct multiple rounds of scan of the object 220 at different displaced locations 340, 350, 360, etc. In at least some of the rounds of scan, the drone 210 moves the camera 212 at a direction away from the key frame location 310 to a displaced location. The directions away from the key frame location 310 may be different for different rounds of scan so that images of the object 220 of different perspectives can be captured and be used to reconstruct a 3D model of the scene. In one embodiment, the change in directions can be based on a predetermined routine. In another embodiment, the change in directions can be arbitrary.

Figure 4A:
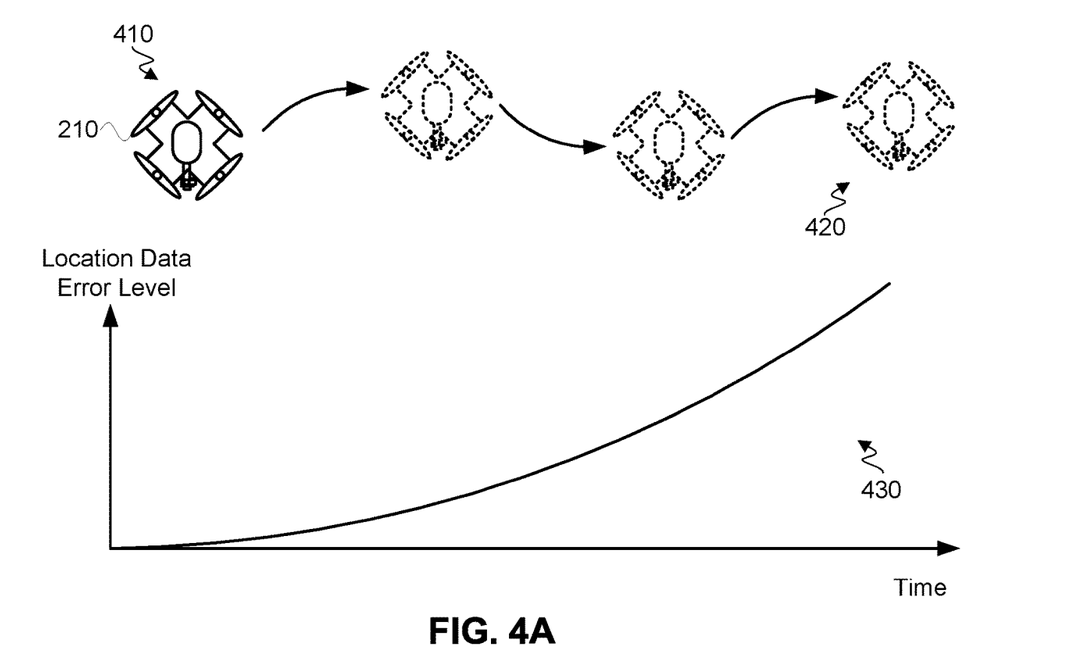
FIGS. 4A and 4B illustrate comparative accumulated location errors for different approaches in determining locations of a camera, in accordance with an embodiment.
Figure 4B:
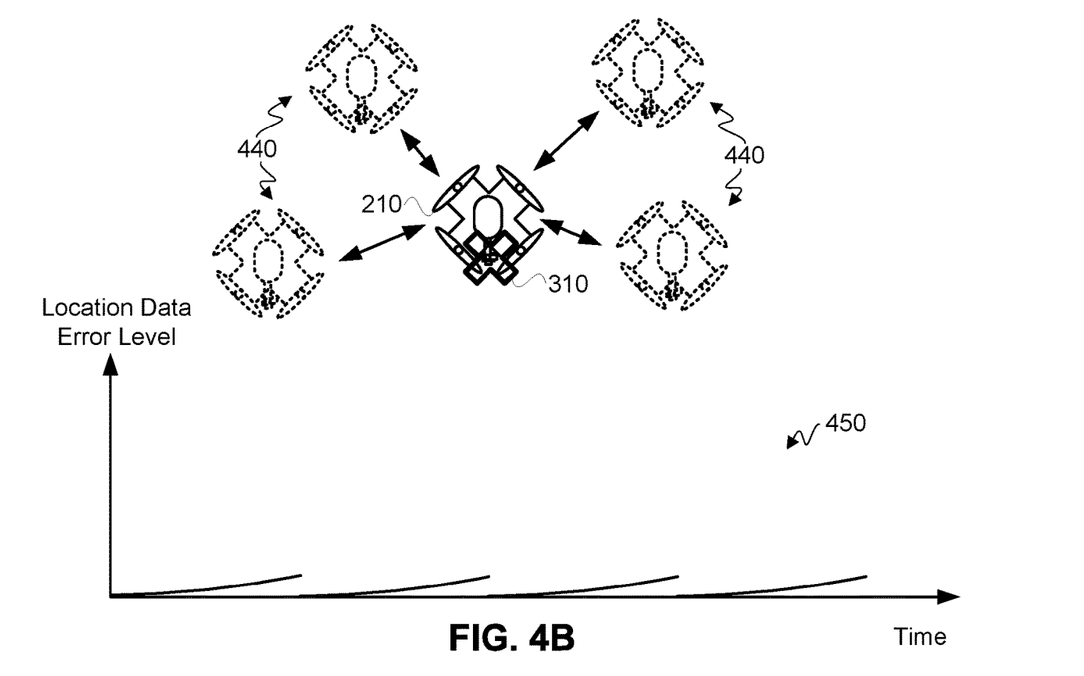

FIGS. 4A and 4B illustrate the benefit of the return-to-the-key-frame approach in controlling a drone surveying a scene. A processor may determine location data of the drone 210 based on the acceleration data of the IMU of the drone 210. FIG. 4A illustrates a survey process in which the drone 210 traverses an area of the scene without repeatedly returning to a key frame location. The drone 210 is first at a location 410 and eventually troves to a destination 420. The camera 212 captures different images of an object (not shown in FIG. 4A) along the path from the location 410 to the destination 420. Since the drone 210 states at location 410, the location data of the drone 210 is computed with respect to the location 410. The plot 430 illustrates the error level of the location data with respect to time during the survey in which the drone 210 travels from the location 410 to the destination 420. The location data may be obtained by twice integrating the acceleration data of the IMU of the drone 210 with respect to time and could vary quadratically with an error factor as time progresses. As such, the error level grows significantly after a certain amount of time. The error level can become so large that the location data becomes no longer reliable to be used in determining the depth of the object or in reconstructing the 3D model of the scene.

FIG. 4B illustrates the recalibration of the location data of the drone using the return-to-the-key-frame approach in controlling the drone 210. The drone 210 performs multiple rounds of scanning of an object (not shown in FIG. 4B) that start from the key frame location 310. The drone 210 moves away in a direction from the key frame location 310 to one of the displaced locations 440, then returns to the key frame location 310. For each round of displacement, the location data of the drone 210 is computed with respect to the key frame location 310. The plot 450 illustrates the error level of the location data with respect to time during the survey in which the drone 210 goes through multiple rounds of displacement and return to the key frame location 310. The location data is obtained by twice integrating the acceleration data of the IMU of the drone 210 with respect to the time from the key frame location 310 or by any other suitable method. As shown in the plot 450, the error level is very limited compared to the plot 430 in FIG. 4A because the location data is recalibrated when the drone 210 returns to the key frame location 310. The abrupt drops in the error level in the plot 450 correspond to the returns of the drone 210 to the key frame location 310 and the location data is recalibrated. By using a short displacement approach, the time for each round of scan is limited so that the error level does not grow significantly with time. As a result, precise location data of the displaced locations 440 can be computed. Although the return of the key frame location at each time may not be perfectly precise, the errors between the original key frame location and a returned key frame location will be small and statistically independent. Additional rounds of scanning may also be performed to generate redundant data. Such precise and redundant data can be combined to determine the precise depth of an object and in reconstructing a 3D model of a scene.

Figure 5:
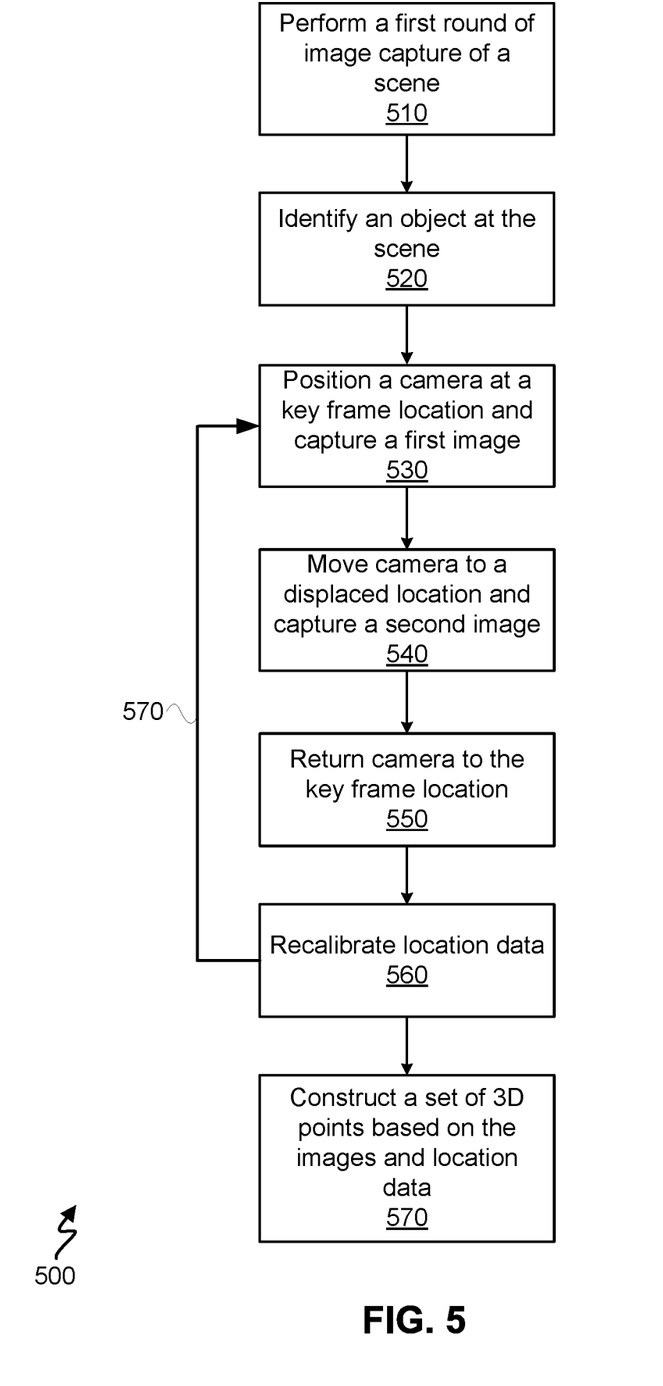
FIG. 5 is a flowchart illustrating a survey process of a scene by a drone using a camera, in accordance with an embodiment.

FIG. 5 is a flowchart illustrating a survey process 500 of a scene by a drone using a camera, in accordance with an embodiment. The process 500 may begin when a drone arrives a scene. The drone performs 510 a first round of image capture of the environment of the scene. The first round of image capture may be a preliminary scan of the scene. The drone identifies 520 an object in the scene. The identification of the object may be performed manually by a person controlling the drone or automatically by finding easily identifiable objects and/or landmarks (e.g. road signs, traffic lights, etc.) in the scene based on a database of images of common objects. A key frame location is determined and the drone positions 530 a camera at the key frame location. The camera captures a first image of the object at the key frame location. The first image may serve as a key frame image that can be used for two purposes. First, the first image can be used as one of the images used to reconstruct a 3D map. Second, the first image can also be used as reference data to allow the drone to identify and confirm that the camera returns to the key frame location. Other reference data (such as GPS location, pressure, attitude, etc.) may also be recorded. The drone then moves 540 the camera away from the key frame location to a displaced location. A second image of the object is captured at the displaced location. The drone then returns 550 the camera to the key frame location. Whether the camera has returned to the key frame location may be verified through the recorded reference data and the key frame image. After the camera returns to the key frame location, the location data of the drone is recalibrated 560. For example, the time used to determine the location data is reset. The process described in 530-550 can be repeated for multiple displaced locations, as indicated by an arrow 570. Some or all of the displaced locations can be in different directions away from the key frame location.

A set of 3D points are constructed 570 based on the images captured in multiple rounds of scanning and based on the location data recorded. Each image captured may be broken down into pixels based on the grey level and color value of each pixel. Feature points and edges of an object can be determined based on various computer imaging techniques such as by constructing the optical flow of the images. The location data can be coordinate data and/or raw acceleration data of the IMU. The timestamps of each return to the key frame location may also be available. For each round of scan, the coordinate data of a displaced location can be computed from the raw acceleration data of the IMU with respect to the timestamp of the last return to the key frame location. Based on the coordinate data and the images captured at different locations and orientations, a reconstructed scene that includes points in a 3D space can be formed. In some cases, the data of the reconstructed scene can be compared and superimposed with other point cloud data obtained from different sources. For example, point cloud data obtained by a LIDAR scan may contain points that have no color values. The data obtained by a camera scan can be aggregated with the LIDAR point cloud data to construct a high fidelity 3D map that has points with color values.

The processes described in FIGS. 3 and 5 can be used to determine the effective modeling of objects in an environment with more accurate depth perception and high precision. The return-to-the-key-frame approach allows large-scale surveys of different areas and precise reconstruction of 3D maps that are traditionally too costly to perform in a large-scale to be performed by low-cost drones.

Figure 6:
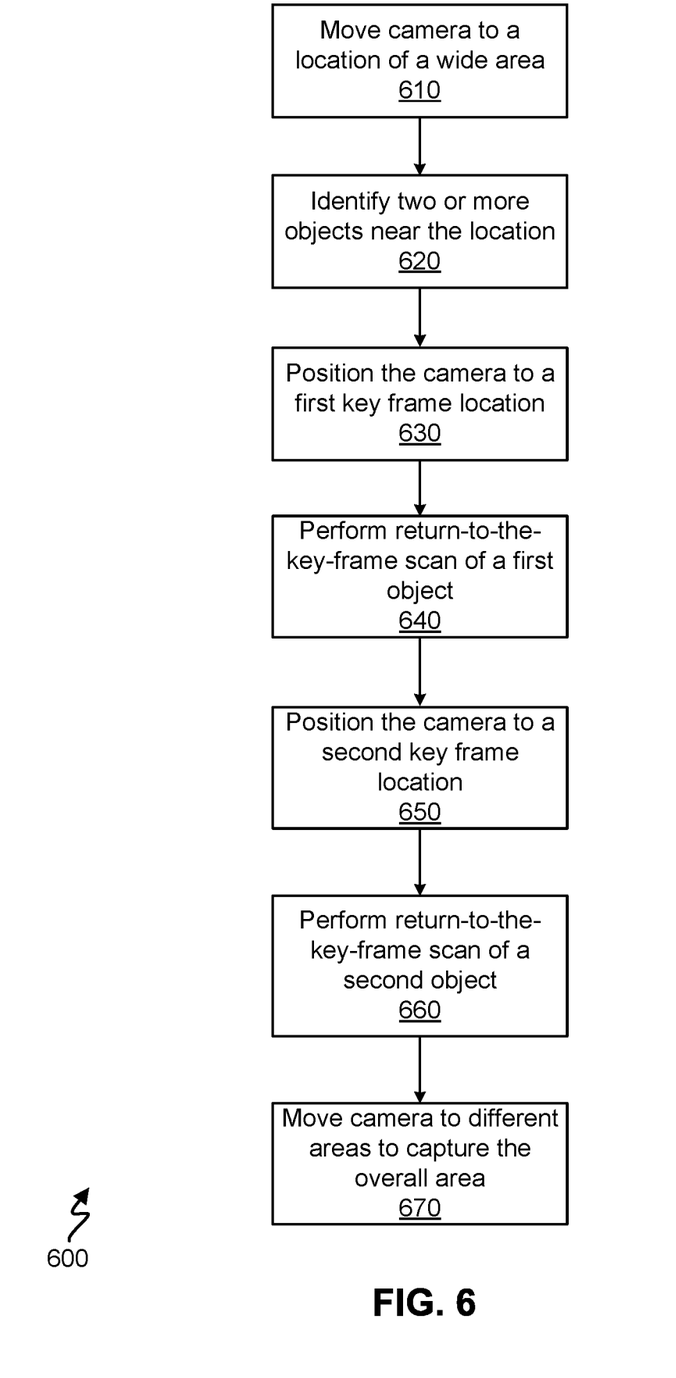
FIG. 6 is a flowchart illustrating a process to conduct a large-scale survey of a wide area using a drone equipped with a camera, in accordance with an embodiment.

FIG. 6 is a flowchart illustrating a process 600 to conduct a large-scale survey of a 3D map of a wide area using a drone equipped with a camera, in accordance with an embodiment. The drone moves 610 a camera to a location of the wide area. The drone then identifies 620 two or more objects near the location. The identification of the objects may be performed manually by a person controlling the drone or automatically by finding easily identifiable objects (e.g. road signs, traffic lights, etc.) in the area based on a database of images of common objects. The drone positions 630 the camera at a first key frame location. The first key frame location may be close to a first object identified. The drone uses the return-to-the-key-frame approach to perform 640 a scan of the first object, After the scan is completed, the precise distance between the camera and the first object can be determined when the camera is moved to other locations by comparing the images at those locations to the 3D model of the first object constructed. After the scan of the first object, the area occupied by the first object may be designated as a key space.

The drone positions 650 the camera at a second key frame location. The second key frame location may be close to a second object identified. The second key frame location may or may not be the same as the first key frame location. The drone uses the turn-to-the-key-frame approach to perform 660 a scan of the second object. After the scan of the second object, the area occupied by the second object may also be designated as a key space. The process can be repeated for additional objects to generate additional key spaces.

After a few key spaces are generated, the precise scale of the area can be determined when the camera is moved to other locations that are not the key frame locations. The drone moves 670 to different areas to capture images that cover the overall areas. The scale of the captured images can be determined based on the location of the drone relative to the key spaces established. Hence, an overall reconstruction of a 3D model of a large area can be formed with the correct scale. In some cases, when the drone travels to a different sector of the area that is far away from the established key spaces, additional key spaces can be established by performing scans of additional objects.

Figure 7:
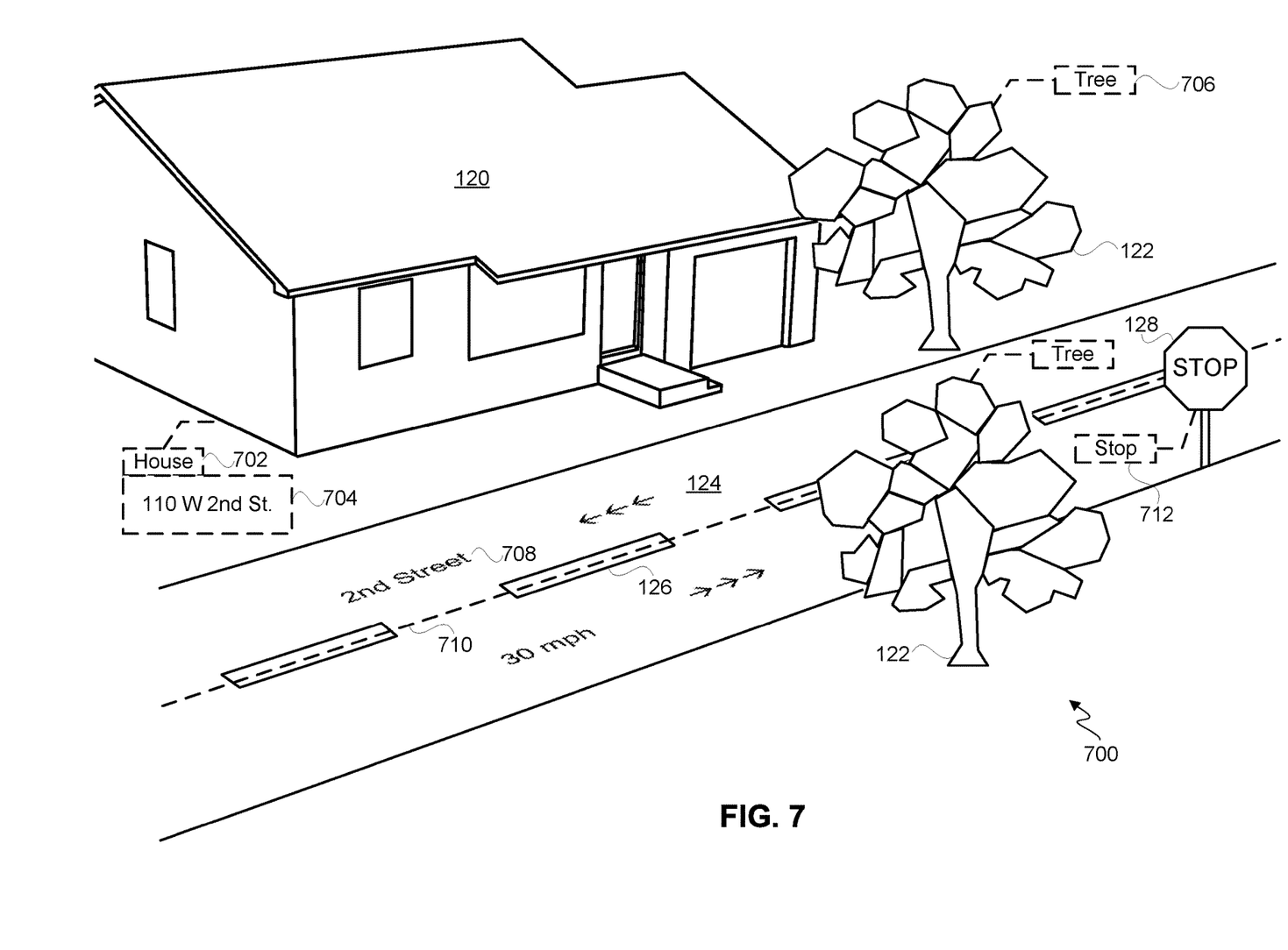
FIG. 7 is a diagram illustrating an exemplary result of a 3D map reconstructed from scanning processes described herein, in accordance with an embodiment.

FIG. 7 is a diagram illustrating an exemplary result of a 3D map 700 reconstructed from the scanning data of a camera. The point data obtained from analyzing different images of a scene are processed and associated with different surfaces and objects. Different 3D polygons are formed by joining points of the point data to create 3D surface elements. Each object, for example, the house 120, the trees 122, the road sign 128, is represented by a combination of 3D polygons that represent different portions and parts of the objects (the polygons are best shown by the trees 122). The 3D polygons are in sizes proportional to each other. In one embodiment, the 3D polygons in the map 700 can be in a precision range of centimeters. Each of the points in a 3D polygon can also be associated with a different color value. Data associated with the moving objects shown in FIG. 1 such as the car 130, the bicycle 132, and the pedestrian 134 are removed so that those objects are not present in the map 700.

In addition to the map geometry that can be stored in a map layer, the map 700 may include additional layers that include metadata annotating the map geometry. Each annotation may be associated with a single or a group of 3D polygons. For example, the house 120 may be labeled with an object identifier 702 "house" and an address 704. The trees 122 may be labeled with an object identifier 706 "tree." In addition, there may be other map layers that are associated with traffic and road information. The street 124 may be labeled with a street name 708 and marked with street divider data 710 that signifies the number of lanes of a street. Traffic regulatory information such as stops (label 712 at the road sign 128), lane direction, yields, speed limit, lane turn restrictions, route paintings, curbs, sidewalks, etc. are stored in one or more map layers.

Figure 8:
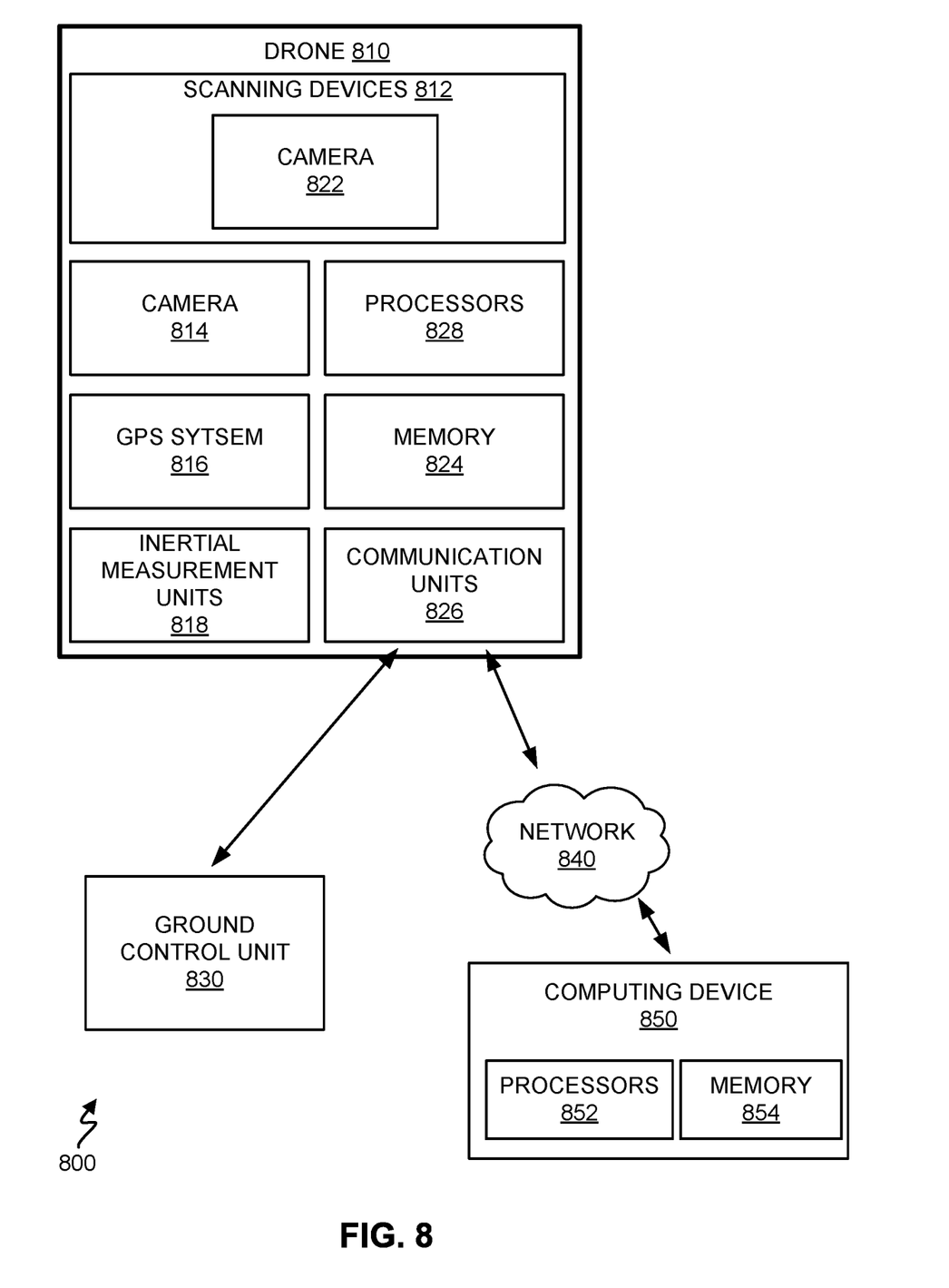
FIG. 8 is a block diagram illustrating an exemplary scene surveying system, in accordance with an embodiment.

FIG. 8 is a block diagram illustrating an exemplary surveying system 800, in accordance with an embodiment. The system 800 includes one or more devices configured to implement one or more embodiments described herein. The system 800 includes a drone 810 that may be controlled by a ground control unit 820 (a ground cockpit). The system 800 also includes a computing device 850 that receives and processes data obtained from the drone 810 through the network 840. The computing device 850 includes one or more processors 852 and memory 854. Depending on the exact configuration and type of computing device, memory 854 may be volatile (e.g. RAM), non-volatile (such as ROM), or some combination of the two. The non-volatile memory may take the form of a non-transitory computer readable storage medium that is configured to store program code. The program code includes instructions that, when executed by one or processors, cause the processors to perform certain processes and operations, in accordance with some embodiments described herein.

The drone 810 may include scanning devices 812, a camera 814, a global position system (GPS) 816, inertial measurement units (IMU) 818, memory 824, communication units 826, and one or more processors 828, The scanning devices 812 are survey devices carried by the drone 810 used to survey the scene. The scanning devices include one or more camera 822. The scanning devices 812 also include mechanical units that allow translations, rotations, and other movements of the photo camera 822. The camera 822 of the scanning devices 812 may be a dedicated camera for surveying the environment. The camera 822 may be synchronized with the processor 828 and is capable of capturing images with precise timestamps.

The camera 814 provides real-time images to the ground control unit 830 to allow a controlling person or device of the ground control unit 830 to navigate through the environment of the drone 810. The camera 814 may be a different camera than the camera 822 of the scanning devices 812.

The GPS 816 provides a global location of the drone 810 on a map. The GPS 816 may allow pre-programed routes that enable the drone 810 to fly in predetermined routes autonomously. The IMU 818 includes accelerometers and gyroscopes. The IMU 818 measures forces, acceleration, and angular rotation of the drone 810. The IMU 818 detects the rate of acceleration and linear movement of the drone 810 using the accelerometers. The IMU 818 detects changes in rotation of the drone 810 using the gyroscopes. The gyroscope also provides stabilization to ensure smooth flight of the drone 810. The GPS 816 and IMU 818 may work together to ensure the drone 810 remains in a relatively stationary manner during extensive scanning of a scene. For example, the GPS 816 may be used to determine the coarse location of the drone 810 while the IMU 818 may be used to determine the movement of the drone 810. The IMU 818 may provide data in the form of acceleration data. Such acceleration data may be processed such as by integration with respect to time to determine the velocity and by further integration to determine the position of the drone 810.

The memory 824 includes one or more storage units that may be volatile, non-volatile, or some combination of the two. The memory 824 stores the firmware and/or operating system of the drone 810. The memory 824 may be in the form of a non-transitory computer readable storage medium that is configured to store program code. The program code includes instructions that, when executed by one or more processors 828, cause the processors 828 to perform certain processes and operations. The memory 824 also includes a storage unit that is used to store data and images captured by the scanning devices 812. In one case, the processors 828 may process preliminary data captured and convert the data into point cloud data. In another case, raw data captured by the drone 810 may be sent to the computer device 850 via the communication units 826 and the network 840. The data, whether processed or not, may be stored in memory 824. Such data can be downloaded from the drone 810 when the drone 810 is landed and/or can be transmitted wirelessly to the network 840. Both processors 828 and processors 852 may cause the scanning operations described herein and may control a drone and the camera.

The communication units 826 include different types of interfaces and gateways to enable wireless and wired communications between the drone 810 and other devices. The communication unit 826 may enable wireless connectivity to a local area network (LAN), a wide area network (WAN), and/or a cellular network such as an LTE network. Besides using standard communication protocols, the communication unit 826 may have dedicated frequency bandwidth used to communicate with the ground control unit 830. In cases of the communication unit 826 having a capability to communicate with a long-range cellular network, the drone 810 may be directed controlled through the network 840 by a computing device 850. The drone 810 may transmit data captured by the scanning devices 812 in real time through the communication units 826 to the network 840. The communication unit 826 may also have a wired interface such as a universal serial bus (USB) that allow users to download data stored in the memory 824 when the drone 810 returns to the ground.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. The computer-readable medium may be a non-transitory computer readable storage medium.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible, non-transitory computer readable storage medium or any type of media suitable for storing electronic instructions, and coupled to a computer system bus.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

directing an aerial drone to position at a key frame location;

capturing a key frame image of an object of a scene using a camera carried by the aerial drone at the key frame location;

recording location data of the aerial drone at the key frame location as the location data at which the key frame image is captured;

directing the aerial drone to move at a first radial direction away from the key frame location to a first displaced location;

capturing a first additional image of the object from the first displaced location;

recording first additional location data of the aerial drone at the first displaced location as the first additional location data at which the first additional image is captured, the first additional location data recorded as different data than the location data at which the key frame image is captured;

returning the aerial drone to the key frame location from the first displaced location;

directing the aerial drone to move at a second radial direction away from the key frame location to a second displaced location, the second radial direction different than the first radial direction;

capturing a second additional image of the object from the second displaced location;

recording second additional location data of the aerial drone at the second displaced location as the second additional location data at which the second additional image is captured, the second additional location data recorded as different data than the location data at which the key frame image is captured and as different data than the first additional location data at which the first additional image is captured.

2. The method of claim 1, further comprising:

reconstructing a set of point data of the object, the set of point data having a plurality of points, each point being associated with a distance from the point to the key frame location.

3. The method of claim 2, wherein reconstructing the set of point data comprises analyzing an optical flow pattern obtained by comparing the image and additional images comprising the first and the second additional images.

4. The method of claim 2, wherein reconstructing the set of point data comprises analyzing homographic relations between the image and additional images comprising the first and the second additional images.

5. The method of claim 1, wherein locations of the aerial drone are determined based on acceleration data generated by an inertial measurement unit (IMU).

6. The method of claim 5, wherein determining the locations of the aerial drone comprises twice integrating the acceleration data generated by the IMU.

7. The method of claim 5, wherein determining the locations of the aerial drone comprises recalibrating location data of the aerial drone after the aerial drone returns to the key frame location.

8. The method of claim 1, wherein the object is a road sign.

9. The method of claim 1, wherein the object is a first object, and the method further comprises:

identifying a second object in the scene;

performing multiple rounds of object scans on the second object using a second key frame location;

determining a distance between the second object and the second key frame location; and determining coordinates of the camera relative to the scene.

10. The method of claim 9, wherein the first key frame location is same as the second key frame location.

11. The method of claim 1, wherein returning the aerial drone to the key frame location from the first displaced location is based on comparing images of the camera to the image captured at the key frame location.

12. The method of claim 1, wherein the image of the object at the key frame location comprises points of the object, each point associated with a scale and an orientation.

13. The method of claim 12, wherein returning the aerial drone to the key frame location from the first displaced location comprises determining whether the aerial drone has returned to the key frame location, the determination comprises capturing images of the object and comparing the points of the object to the points in the image at the key frame location based on the scale and the orientation of the points in the image at the key frame location.

14. A system comprising:

a camera configured to capture images of an object of a scene;

an aerial drone carrying the camera; and a processor communicably coupled to the drone and the camera, the processor configured to:

direct the aerial drone to position at a key frame location;

direct the camera to capture a key frame image of the object of the scene at the key frame location;

record location data of the aerial drone at the key frame location as the location data at which the key frame image is captured;

direct the aerial drone to move at a first radial direction away from the key frame location to move the camera to a first displaced location, direct the camera to capture a first additional image of the object from the first displaced location, record first additional location data of the aerial drone at the first displaced location as the first additional location data at which the first additional image is captured, the first additional location data recorded as different data than the location data at which the key frame image is captured;

direct the aerial drone to return to the key frame location from the first displaced location, direct the aerial drone to move at a second radial direction away from the key frame location to a second displaced location, the second radial direction different than the first radial direction, direct the camera to capture a second additional image of the object from the second displaced location;

record second additional location data of the aerial drone at the second displaced location as the second additional location data at which the second additional image is captured, the second additional location data recorded as different data than the location data at which the key frame image is captured and as different data than the first additional location data at which the first additional image is captured.

15. The system of claim 14, wherein the processor is further configured to:

reconstruct a set of point data of the object, the set of point data having a plurality of points, each point being associated with a distance from the point to the key frame location.

16. The system of claim 15, wherein reconstruct the set of point data comprises analyze an optical flow pattern obtained by comparing the image and additional images comprising the first and the second additional images.

17. The system of claim 15, wherein reconstruct the set of point data comprises analyzing homographic relations between the image and additional images comprising the first and the second additional images.

18. The system of claim 14, wherein the processor is further configured to determine locations of the aerial drone based on acceleration data generated by an inertial measurement unit (IMU) carried by the aerial drone.

19. The system of claim 18, wherein determining the locations of the aerial drone by the processor comprises twice integrating the acceleration data generated by the IMU.

20. The system of claim 18, wherein the processor is further configured to recalibrate location measurement of the aerial drone after the aerial drone returns to the key frame location.

* * * * *